: 3,510,400
Patented May 5, 1970

---

3,510,400
METHOD FOR OBTAINING SOLANUM ALKALOIDS AND SAPOGENINES FROM PLANT MATERIALS
Bjarte Löken, Santurce, Puerto Rico, and Irving V. Sollins, Rye, N.Y., assignors to Phytogen Products, Inc., Caguas, Puerto Rico, a corporation of Delaware
No Drawing. Filed Apr. 26, 1966, Ser. No. 545,270
Int. Cl. C12c *11/00;* C07c *173/00*
U.S. Cl. 195—37        8 Claims

ABSTRACT OF THE DISCLOSURE

The present invention discloses a procedure for obtaining solanum alkaloids and sapogenins from plant material. The process involves carrying out acid hydrolysis at a pH in the range of pH 1.0–2.5 and at temperatures in the range of 110–145° C. The subsequent recovery is effected by neutralizing the reaction mixture to a pH in the range of pH 5–6 followed by filtration and subsequently extraction of the steroid content from the filter cake by means of a suitable organic solvent. If desired, the aqueous filtrate may be fermented to yield a yeast product and/or alcohol from the sugars and carbohydrates present therein.

---

The present invention relates to the production of the solanum alkaloids and also to the recovery of sapogenins from saponin containing plant material through mild acidic hydrolysis of the whole plant or portions thereof such as the tubers and leaf pulp.

The solanum alkaloids notably tomatidine and solasodine have aroused considerable interest as possible source materials for stereoidal hormones. Solasodine can be degraded to 16-dehydro pregnenolone with almost the same efficacy as diosgenin, a hitherto preferred source material. Tomatidine which has a saturated ring A degrades to 16-dehydro 5α-pregnanolone.

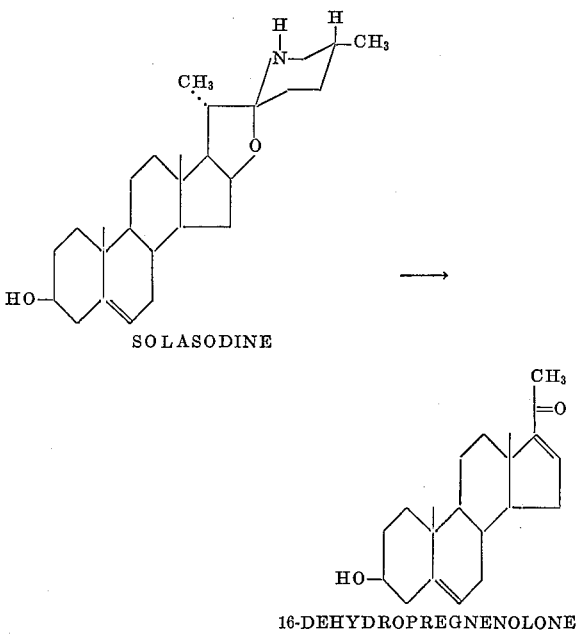

Both 16-dehydropregnenolone and 16-dehydropregnenolone are starting points for synthesis of many steroids of widespread pharmacologic use.

In the plant material solasodine and tomatidine are present as glycoalkaloids in which a chain of 3 or 4 sugar monosaccharide groups are connected at the 3 hydroxy position by a glyclosidic bond. The most common of the glycoalkaloids, solasonin is believed to have the composition: Rhamnosido-, galactosido-glucosido-solasodin. Solasodarnin is rhamnosido- rhamnosido- galactosido-glucosido-solasodin. Tomatin is lycotetrasido-tomatidine. Among the preferred species of plant materials for obtention of the solanum alkaloids are *Solanum laciniatum* Ait (for solasodin) *Solanum lycopersicum* L. (for tomatidin). Others are *Solanum boerhavii* and *Solanum nigrum*.

A conventional procedure for recovering these glycoalkaloids involves first an aqueous acidic extraction effected directly on the plant material (fresh or dried). The extract of the glycoalkaloid is then alkalinized, e.g., by ammonia, lime, caustic soda, to precipitate the glycoalkaloid, followed by filtration of the precipitate. Unfortunately coprecipitates of somewhat slimy materials tend to plug the filter. For this reason filter aids such as Celite, diatomaceous earth, silica gel, calcium sulfate, are employed, making a subsequent extraction step (e.g., with methanol) necessary to recover glycoalkaloid from the filter cake. In any event the recovered glycoalkaloid is hydrolyzed with a relatively strong mineral acid (1–2 N) in aqueous alcoholic or aqueous medium. The spiralaminoketal alkaloid (e.g., solasodine) is thereafter precipitated by addition of a base to the hydrolysis reaction mixture.

While direct acid hydrolysis of the plant material might be employed to obtain the spiroaminoketal alkaloid more directly, effects to perfect this approach have been beset with serious problems, including the substantial expense for the acid. In addition to hydrolysis of glycoalkaloid there is a concurrent conversion of some plant materials into tars, color bodies and resinous impurities. Subsequent recovery of a pure spiroaminoketal alkaloid from the hydrolysis reaction mixture is complicated by presence of these coproducts, necessitating an extensive recovery and purification sequence. To a great extent the art has neglected the solanum plants as a steroid source because of the recovery problems.

It has now been discovered that one step direct acid hydrolysis of the solanum plant material can be effected, facilely, if effected at pH 1–2.5 under superatmospheric pressure autoclaving conditions at 110°–145° C. Partial neutralization to pH 5–6 insolubilizes the spiroaminoketal alkaloids (e.g., solasodine, tomatidine). Filtration of the solids is relatively trouble free because the cellulose content of the plant material serves as a filter aid, because the mild hydrolysis conditions minimize formation of resins, color bodies, etc., and because much of the impurities remain in solution at pH 5–6. The free spiroaminoketal is extracted directly from the filter cake, preferably with an aliphatic gas naphtha (a hexane-heptane refinery cut) which is a selective solvent.

The present procedure has the numerous advantages of:
 (a) One step extraction and hydrolysis
 (b) Minimal acid and base consumption (pH–1 is about 0.1 N HCl)
 (c) Per generation of filter aid in situ (cellulose, bast fibers, etc.)
 (d) High purity, high yield, e.g., no formation of Δ-3,5-diene steroids through dehydration of the 3-hydroxyl group
 (e) A filtrate effluent of potential value.

To carry out acid hydrolysis according to the practice of the present invention, the plant material is finely divided by grinding, maceration, etc. and mixed with just enough water to form a fluid mass that can be agitated readily in the reaction vessel. The acid, which may be admixed in with the water or added separately afterward is actually added in quite small quantities. As has already been indicated an aqueous acid solution of pH of 1–2.5 is only about 0.1–0.002 N (of for example HCl).

The acid itself is employed only to create the hydrolytic acid conditions. Preferred are the inexpensive inorganic acids, i.e., the mineral acids. Specifically preferred are sulphuric, hydrochloric, phosphoric acids. Hydrochloric acid seems to give the best performance, sulphuric acid is cheapest but not quite as good because its use results in a slightly darker hydrolyzate (possibly due to its oxidizing properties). Phosphuric acid is particularly desirable when the hydrolyzate filtration is later to be inoculated with saccharomyces for the production of cattle feed yeast from the hydrolyzate. However, other inorganic acids which are satisfactory are nitric acid, sulphurous acid and perchloric acid.

It may be noted that included in the acids listed above are strong and weak acids, e.g., hydrochloric phosphoric acid, and oxidizing, e.g., nitric, even both, e.g., sulfurous, perchloric. Virtually any acid seems capable of effecting the hydrolysis. The important factor appears to be the hydronium ion $(H_3O)^+$ concentration. In weak acids like phosphoric acid the degree of dissocation characteristically increases with lowered concentration and with elevated temperatures. At the low molar concentrations involved in the present hydrolysis procedure. The weak acids, notably phosphoric acid produce a usable hydronium ion concentration, one moreover which is of the same order of magnitude as a stronger mineral acid, e.g., HCl in corresponding quantities. This high pH characteristic of the present hydrolysis procedure allows there use of phosphoric acid for the hydrolysis.

The low acid concentration already alluded to requires some precautionary evaluation of the acid quantity to allow for the effects of the residual base content in the plant material, like metal cations, $Ca^{++}$, $Mg^{++}$, $K^+$ normally coordinated by organic acids or present in the chlorophyll content and the nitrogen bases and amines present in the plant material (the solanum contains amines). As a practical matter enough acid is added to give a slightly lower than desired pH, e.g., 0.012–0.12 N. Then after about an hour or so of autoclaving at the desired reaction temperature the pH of a sample is tested. Usually the pH measured then is higher than the initial pH value. The pH contemplated for practice of the present invention is the pH present at reaction conditions.

Mention has already been made that autoclaving reaction temperatures in the range of 110–145° C. are employed for the acid hydrolysis. Specifically preferred is the range of 125–135° C., which seems to be an optimum range.

Reaction time can be varied considerably with a reaction period of about 5 hours being preferred (principally for reasons of efficient equipment and work scheduling). However, the inter-relationship between pH, temperature, reaction time, material variations, different acids is reasonably predictable, e.g., high pH, higher temperatures, or more reaction time so that few trial and error sample runs are needed to select an optimum set of conditions for any specific feed, acid, etc., in the available plant equipment.

In passing it is noteworthy that chemical plant equipment is customarily designed to withstand internal pressure loads (e.g., 30 p.s.i.g.) levels contemplated for the present hydrolysis procedure.

Surprisingly it has also been found that the same procedure operates equally satisfactorily on the saponin bearing plant material customarily employed for the recovery of sapogenins, notably the group consisting of liliaceae, amerillidacea and dioscoreaceae.

In the instance of the spiroaminoketal alkaloid their acid solubility requires the neutralization to pH 5–6 in order to precipitate out the desired product. However, in the instance of the sapogenins their insolubility in the acid reaction mixture would seem to make unnecessary the partial neutralization to pH 5–6. However, in practice it has been found that a much cleaner sapogenin filter cake product is obtained by first partially neutralizing the reaction mixture to the same pH 5–6 range. Apparently, the partial neturalization serves either to maintain in solution impurities which otherwise would interfere with the subsequent filtration or to solubilize impurities that otherwise would tend to clog the filters.

When the present dilute acid hydrolysis is applied to recovery of sapogenins the color of the hydrolysis reaction mixture is very light, being much lighter than that of prior art practices employing strong mineral acids (e.g., 2–4 N hydrochloric acid), lighter even than from the modified pulping procedure of prior Löken Pat. 3,136,761 issued June 9, 1964. The sapogenin product yield from a given plant source is greater than that of the strong acid hydrolysis technique, and is about equal to the yield obtained by the pulping hydrolysis system. Vis-à-vis the pulping hydrolysis system of Pat. 3,136,761 the present mild hydrolysis offers substantial savings in $SO_2$ and an avoidance of high concentrations of $Na^+$, $Ca^{++}$ in the filtrate. The same ease of product recovery exists.

As a further comment on the recovery of the steroid product by filtration of the mild acid hydrolyzate, the hydrolysis apparently frees and purifies the fibrous cellulose enough to form a beneficial filter aid therefrom. The filter cake consists in essence of the cellulose and the sapogenin or the spiroaminoketal. The free spiroaminoketal base or the sapogenin are solvent extracted from the filter cake preferably using a relatively inexpensive hydrocarbon fraction solvent, such as a hexane, heptane fraction, and then recovered from the extract by conventional techniques.

The filtrate product from the mild acid hydrolysis reaction mixture contains any sugars originally present in the plant material as well as the sugars obtained from starch, hemicellulose and the glycosides. The filtrate has already been neutralized to pH 5–6. In short it constitutes an excellent starting material for fermentation purposes. Byproducts readily obtained therefrom add substantially to the favorable economics of the present process. The filtrate broth may be inoculated with saccharomyces yeast (or torula yeast) and the mixture aerated to multiply the yeast into sizable quantities of a yeast cattle feed stock high in protein and other nutritive ingredients like the B vitamins. Overall then there may be a substantial advantage in employing phosphoric acid for the acid in the mild acid hydrolysis and subsequently using ammonia to partially neutralize the reaction mixture. Ammonium phosphate forms a nutritive ingredient in a fermentation medium, assisting in growth of a maximum yield of yeast. The possibility of so utilizing the hydrolysis filtrate is important to the practice of the present invention, since the solanum and other steroidal plant sources are most available in the somewhat remote rural tropic regions which suffer from a chronic protein deficiency. Specifically contemplated for practice of the present invention is carrying out the procedure in such remote regions with phosphoric acid and ammonia and then fermenting the filtrate with torula yeast, a strain which is not easily contaminated. The fermentation can be carried out in readily constructed wooden vats. The hydrolysis itself can be effected in relatively uncomplicated reaction vessels, they need not be capable of withstanding an internal pressure of more than about 2 to 3 atmospheres (30 p.s.i.g.). Fortunately, chemical plant equipment is built routinely to withstand such pressure levels.

Preferred practice of the invention in more urban areas is somewhat different since there it may be more desirable to ferment the filtrate for alcohol production or perhaps simply to reduce the sewage disposal load represented by an unfermented filtrate. In such event maximum production of yeast is not an important factor and hydrolysis can be effected with less expensive acids like sulfuric or hydrochloric acid. Then too the base for neutralization can be predicated on cost and lime used. In more urban areas the neutralized filtrate may be inoculated with saccharomyces. The alcohol product may be distilled directly from the broth and rectified to a desired concentration.

Since the plant materials used in practice of the present invention are selected for steroid content (rather than cellulose) the final filtrate contains a substantial sugar content being higher than for example as in waste sulfite liquors which have been commercially fermented. The fermentation vats and distillation columns for a given rate of alcohol production is on a smaller scale than in the waste sulfite industry, allowing otherwise obsolete equipment (e.g. cast iron rum stills) to be employed economically.

A further arvantage of practice of the present invention is that the biological oxygen demand (BOD) of the fermented filtrate is low enough that most communities will allow its entry into the municipal sewage system. By comparison the final fermentation effluent from the pulping hydrolysis technique of Pat. 3,136,761 has a substantial ion content of $SO_3^{--}$, $HSO_3^-$, $SO_4^{--}$, $Mg^{++}$, $Ca^{++}$. The liquid effluent discard from a strong acid hydrolysis has both the ion content ($SO_4^{--}$, $Cl^-$) and a high BOD.

For a better understanding of the practice of the present invention the following specific examples of preferred practices thereof are presented for exemplary purposes. They are not however to be construed as limiting the invention to the materials described nor to exclude obvious secondary modifications which do not alter the desired results.

EXAMPLE I

A dry sample weighing 100 g. of the whole plant of *Solanum boerhavii* shell was cut into pieces and ground up in a Waring Blendor in several portions with a total of 750 ml. of water. To the resulting suspension was added 2.00 g. of hydrogen chloride gas from a steel cylinder, and the resulting mixture (in a steel flask with a screw cap) was heated submerged in an oil bath at 135° C. for a period of 5 hours. A small sample drawn after a 1 hour heating period showed pH—ca 1.80.

The content of the steel flask was allowed to cool, and transferred to an Erlenmeyer flask where it was neutralized to pH—6 with a 0.5 N sodium carbonate solution. The slurry was filtered, and the solid hydrolyzate washed with distilled water, until the filtrate was colorless. The solid hydrolyzate filter cake was dried overnight, then extracted exhaustively with a 500 ml. of a low boiling point petroleum fraction (naphtha) in a Soxhlet extraction apparatus. The clear, slightly yellowish-greenish extract was concentrated to about 150 ml. Upon standing at room temperature in such a way that the solvent was permitted to evaporate very slowly, tomatidin crystallized out, and was eventually harvested by filtration. The greenish crystals were washed with a little haxane, collected and dried. The yield was 12 g., which was forthwith recrystallized from ethyl acetate/ether using activated carbon (Darco). A colorless sample was obtained exhibiting M.P. 204–209°, $(\alpha)_D^{24}+7°$ (alcohol), and found identical with an authentic sample of tomatidin by infrared comparison and mix melting point determination.

The aqueous filtrate from the hydrolysis was combined with the water washings (altogether 1.2 l.), and incubated at 28° C. with saccharomyces yeast (baker's yeast), and allowed to ferment for 3 days under anaerobic conditions. Alcohol determination of a sample of the broth showed that 10.3 ml. alcohol could be obtained from 100 g. of plant material. The residual sugar content in the fermented liquor was found to be negligible (in the order of 0.1%) according to the Bertrand method.

EXAMPLE II

A sample of apparently *Solanum nigrum* had been harvested in the beginning of November in the hills of northeastern Puerto Rico, where it grows wild in abundance. At that time of the year the fruits were apparent as green berries. This plant material was dried, ground on a quarn and milled to a greenish grayish powder by means of a hammer mill. Then 100 g. of this powder was charged into a stainless steel flask with 500 ml. of hot water. To the slurry was added 5 g. of 80% technical phosphoric acid, and the mixture was kept at 130–135° for 5 hours. The temperature was read on a thermometer inserted through the cap of the stainless steel flask. pH after one hour at temperature was measured at 25° C. in a drawn small sample and found to be pH 2.2. After completion of the heating cycle, the reaction mixture was cooled, neutralized with 0.4 g. ammonia which resulted in a measured pH of 6.0 in the hydrolyzate mixture. The solids were separated by filtration, and washed on the filter with approximately 300 ml. water containing a trace of ammonia (to pH—8.5). The solids were collected, dried and extracted exhaustively with hexane in a Soxhlet extraction apparatus by about 500 ml. hexane. The hexane extract was evaporated to about 100 ml. and allowed to stand in the laboratory for several days permitting the solvent to evaporate very slowly. In this manner crystals formed. The crystals were filtered, and were washed with a little hexane. These crystals (500 mg.) were recrystallized from ethyl acetate/ether using activated carbon (Darco), and gave an almost white sample of solasodin with M.P. 198–199°, $(\alpha)_D$, $-81°$ (alcohol). No depression in melting point could be observed upon admixture with an authentic specimen.

Ultraviolet measurements of materials isolated by concentration of the extract mother liquors failed to show any evidence of 3,5-diene, which is reported to form as a undesired side product during stronger conditions of acid extraction and hydrolysis.

The aqueous filtrate from the hydrolysis contains the necessary anions and cations for yeast growth: $Ca^{++}$ and $K^+$ from the ash of the plant material $PO_3^{---}$ from the hydrolysis acid $NH^+$ from the protein content of the plant material and neutralizing ammonia. This aqueous filtrate was inoculated with a sacchraomyces strain of yeast. The temperature was maintained at 28° C., and air was blown in through a fritted disc equipped glass tube. After 24 hrs. the yeast cells were separated by centrifugation, dried to give 8 g. (dry weight) yeast. This yeast was found to have a 40% protein content (N, 6.25).

EXAMPLE III

A sample of fresh tubers from *Dioscorea floribunda* with a moisture content of 69.6% weighed 85 g. This material was macerated in a Waring Blendor with 85 ml. of water, and thereafter charged into a 500 ml. stainless steel flask (or a 500 ml. "Pyrex" pressure reaction bottle with heating mantle from a Parr-hydrogenation apparatus). A portion of 55 ml. water containing 0.53 ml. concentrated sulfuric acid was used for rinsing the blender and subsequently transferred to the reactor. A total of 200 ml. water was calculated as being present counting the moisture (60 ml.=60 g.) in the tubers. The mixture was heated to and kept at 120–130° for 5 hours. The amount of concentrated sulfuric acid added corresponds to an indicated acidity on basis of total water present of pH=1.0. The pH measured in a sample drawn after 1 hour at reaction temperature was pH 1.17.

After completion of the heating period, the mixture was cooled and neutralized with a very small amount of an aqueous slurry of hydrated lime to bring the pH to 5 under vigorous agitation. In most instances only 360 to 500 mg. of hydrated lime is required. The hydrolyzate was collected by filtration, and the solids on the filter washed with 50 ml. of water, then with 50 ml. of a saturated solution of calcium hydroxide (containing Ca 100 mg. Ca(OH)$_2$), followed with 100 ml. of water. The solid hydrolyzate was collected and dried. It weighed 5.75 g., had a light tan color with some very small lighter spots. This material was extracted exhaustively with a light petroleum fraction (gas naphtha, in Latin American lands: gas solvente) by means of a Soxhlet extractor. Evaporation of the extract to a small volume gave rise to isolation of 1.87 g. of diosgenin in two crops. The melting point of this crude but white crystalline diosgenin was 198–204°. Specific rotation: $(\alpha)_D^{24°} = -125°$ (chloroform). Infrared spectrum and mix melting point determination showed its identity with an authentic specimen of diosgenin. The yield of 1.87 g. corresponds to 7.23% based upon the dry solids in the root, 2.20% based upon the original weight (85.0 g.) of the fresh tubers. This result is about 20 relative percent higher than with assay methods (see U.S. 3,136,761 and Agricultural and Food Chemistry 6 (1958) p. 856).

The hydrolysis filtrate was combined with the aqueous washes (total volume 400 ml.) and inoculated with saccharomyces (baker's yeast). Fermentation for 3 days under anaerobic conditions at 28° followed by scavenging distillation gave a yield of 95% alcohol corresponding to 11 ml.

EXAMPLE IV 85 g. of fresh tubers of *Dioscorea composita* (moisture content 83.9%) was macerated in a Waring Blendor with 85 ml. of water, and thereafter charged into a 500 ml. "Pyrex" pressure reaction bottle from a Parr hydrogenation apparatus. The bottle is equipped with an electrical heating mantle, and a thermometer which indicates the internal temperature. The bottle is connected with a manometer. A portion of 50 ml. water containing 0.50 g. hydrogen chloride was used for rinsing in the blender and subsequently transferred to the flask. Approximately 200 ml. water was calculated as being present counting the moisture as 65 ml.=65 g. The indicated pH (0.5 g. HCl ad 200 ml.) was 1.15. The pH measured after 1 hour at reaction temperature 127–135° was pH 1.30. The reaction temperature was maintained for a total of 5 hours. The pressure reading was 32 p.s.i.g. at 130° C.

The mixture was cooled and neutralized with sodium hydroxide to pH 5 (400–500 mg. NaOH required). The hydrolyzate was collected by filtration washed with a total of 200 ml. of tap water, dried and weighed. It weighed 4.27 g. This material was extracted exhaustively with hexane (in a Soxhlet) and the extract evaporated on the steam bath to a small volume. The crystals which formed were filtered, washed with a little hexane on the filter and the filtrate concentrated to give a second crop of crystalline material. In this manner a total of 911 mg. of diosgenin was obtained in the two crops, corresponding to 1.07% of the total fresh weight or 6.70% of the dry solids in the tubers (13.6 g.). The diosgenin obtained was of excellent quantity: M.P. 199–203°, $(\alpha)_D -124°$ (chlf.). The identity with an authentic sample was established by infrared comparison and mix melting point determination. Conventional assay of this same sample destroyed diosgenin to the extent that only 5.8% was obtained on basis of dry tuber solids. Fermentation as described in Example III led to only 5 ml. of alcohol, a yield explicable from the fact that this root sample has a high moisture content (83.9%).

EXAMPLE V

A mixture of pulp and juice (rather juice containing considerable amounts of pulp) from a sisal (*Agave sisalana*) fiber separation at Barquisimeto in the state of Lara in Venezuela was separated at the decorticator. A quantity of 10 l. of this green very turbid suspension was separated and charged into a pilot reactor with 25 ml. of concentrated technical sulfuric acid.

This amount of sulfuric acid gave an indicated pH of a little over 1, and a measured pH of 1.5 (measured at 20° in a sample drawn after 1 hour at 130°). This temperature ($\pm 5°$) was maintained for a total of 5 hours. The pressure indicated on the gauge was 32–34 p.s.i.g. The content was cooled and neutralized with ammonia (pH 5) and filtered in a centrifuge. The cake was washed, collected, and dried. This solid hydrolyzate weighed 240 g., from which 12.5 g. of crude hecogenin was obtained by toluene extraction, and concentration to a small volume (Ca 120 ml.). The hecogenin exhibited the following constants after being recrystallized from ethyl acetate: M.P. about 250–252°, $(\alpha)_D + 15$ (chloroform).

Inoculation of the combined filtrates and wash waters from the separation of the solid hydrolyzate with a strain of torula yeast led to a yield of 250 g. of dry torula yeast. The fermentation was essentially carried out as described in Example II. It appeared that at certain times of the year it was necessary to add some soluble phosphate, to obtain a complete utilization of the sugar content of the filtrate. The sugar contents had to be controlled during the progress of the fermentation, if it failed to decrease to almost zero, some superphosphate (inexpensive phosphate containing fertilizer) had to be added.

The sisal processing is carried out at larger haciendas, where the cattle in part feed on the henequen pulp. Because of the predominance of carbohydrate in the diet, it is in particular advantageous to have access to a protein feed like the torula yeast, which can be fed directly to the cattle without prior drying.

Numerous variations from the specific details described above may be employed without departing either from the spirit of the present invention or the scope of the appended claims.

What is claimed is:

1. A process for obtaining the steroid content from plant material containing solanum alkaloids or saponins which comprises subjecting such plant material in a finely divided state to mild acid hydrolysis with an acid selected from the group consisting of hydrochloric, phosphoric and sulfuric at a pH in the range of 1.0–2.5 at temperatures in the range of 110°–145° C., thereafter neutralizing the hydrolysis reaction mixture to a pH in the range of 5–6, then separating the insoluble material from the aqueous portion of the hydrolyzate and extracting the steroid content from the insoluble material with an organic solvent.

2. The process of claim 1 wherein the hydrolysis is effected at a temperature in the range of 125° C.–135° C.

3. A process for obtaining the steroid content from plant material containing solanum alkaloids or saponins which comprises subjecting such plant material in a finely divided state to mild acid hydrolysis with an acid selected from the group consisting of hydrochloric, phosphoric and sulfuric at a pH in the range of 1.0–2.5 at temperatures in the range of 110°–145°, thereafter neutralizing the hydrolysis reaction mixture to a pH in the range of 5–6, then separating the insoluble material from the aqueous portion of the hydrolyzate, said insoluble material including the steroid content of the hydrolyzate and thereafter fermenting the aqueous portion of the hydrolyzate with yeast to yield yeast and alcohol products.

4. The process of claim 3 wherein the fermentation is effected aerobically with torula yeast to yield only a yeast product.

5. A process for obtaining hecogenin from the leaf pulp of agave plants which comprises subjecting the leaf pulp to mild acid hydrolysis with an acid selected from the group consisting of hydrochloric, phosphoric and sulfuric at a pH in the range of 1.0–2.5 at temperatures in the range of 125–135° C., thereafter neutralizing the hydrolysis reaction mixture to a pH in the range of 5–6, then separating the insoluble material from the aqueous portion of the neutralized hydrolyzate and extracting the hecogenin from the insoluble material with an organic solvent.

6. A process for obtaining diosgenin from tubers of dioscoreaceae plants which comprises subjecting ground tubers to mild acid hydrolysis with an acid selected from the group consisting of hydrochloric, phosphoric and sulfuric at a pH in the range of 1.0–2.5 at temperatures in the range of 125°–135° C., thereafter neutralizing the hydrolysis reaction mixture to a pH in the range of 5–6, then separating the insoluble material from the aqueous portion of the neutralized hydrolyzate and extracting the diosgenin from the insoluble material with an organic solvent.

7. A process for obtaining solanum alkaloids from solanum plants which comprises subjecting the plant material to mild acid hydrolysis at a pH in the range of 1.0–2.5 at temperatures in the range of 125°–135° C., thereafter neutralizing the hydrolysis reaction mixture to a pH in the range of 5–6, then separating the insoluble material from the aqueous portion of the neutralized hydrolyzate and extracting the solanum alkaloid from the insoluble material with an organic solvent.

8. The process of claim 7 wherein the solanum alkaloid so recovered is a member selected from the group consisting of solasodine and tomatidine.

References Cited

UNITED STATES PATENTS

| | | |
|---|---|---|
| 2,780,620 | 2/1957 | Krider et al. _____ 260—210.5 |
| 3,019,220 | 1/1962 | Julian. |
| 3,136,761 | 6/1964 | Loken. |

ALVIN E. TANENHOLTZ, Primary Examiner

U.S. Cl. X.R.

260—210.5, 239.55, 292